Dec. 9, 1924.                                            1,518,258
F. A. FAHRENWALD
APPARATUS FOR PRODUCING AND MAINTAINING HIGH TEMPERATURE
Filed March 2, 1921          2 Sheets-Sheet 1
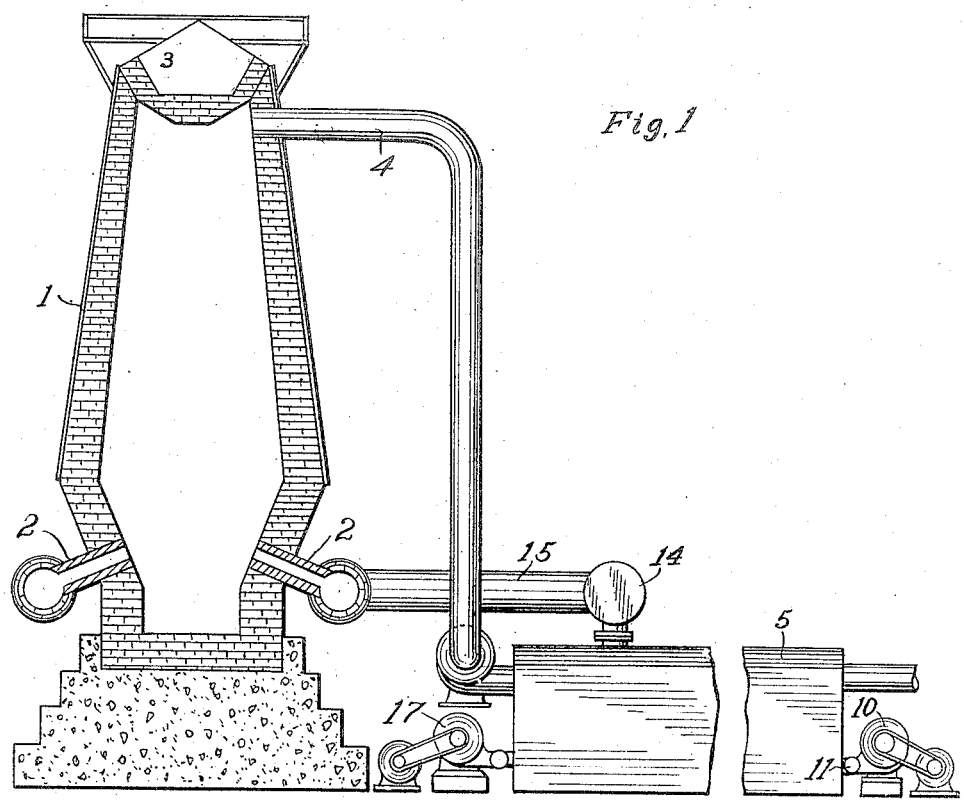
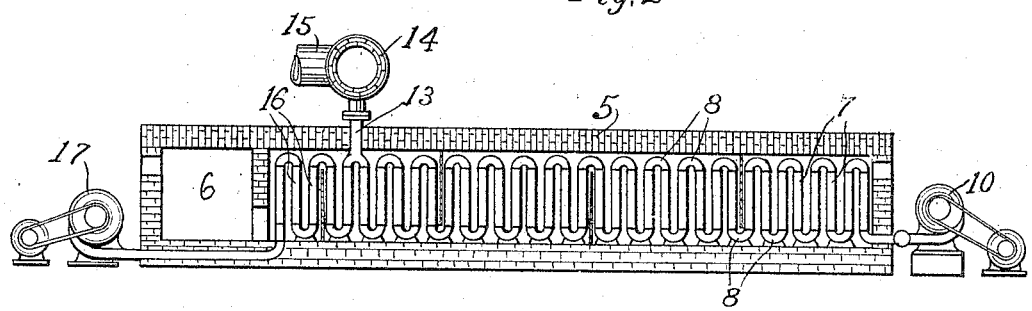
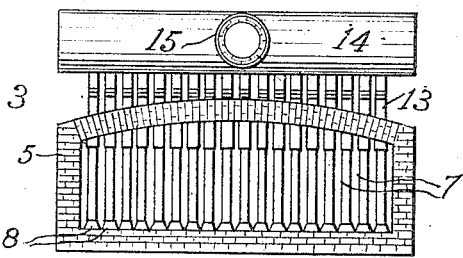

Dec. 9, 1924.
F. A. FAHRENWALD
1,518,258
APPARATUS FOR PRODUCING AND MAINTAINING HIGH TEMPERATURE
Filed March 2, 1921    2 Sheets-Sheet 2
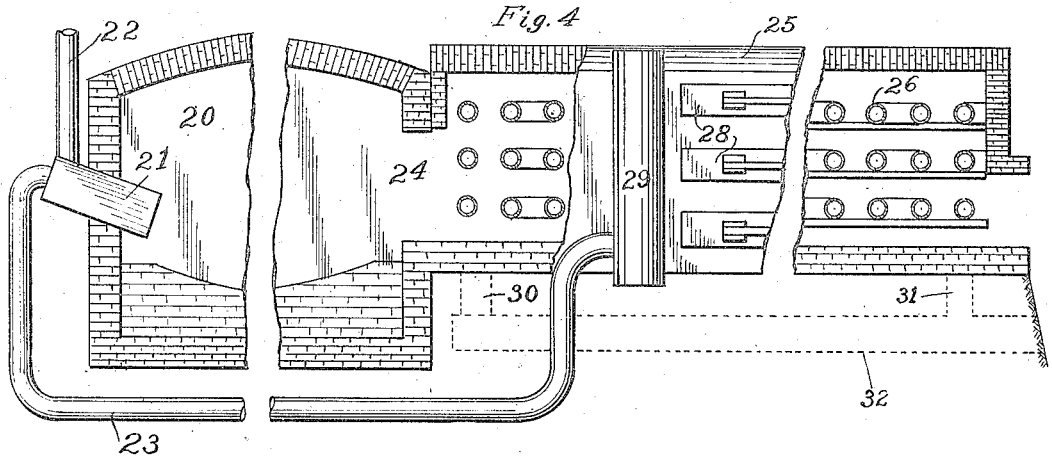
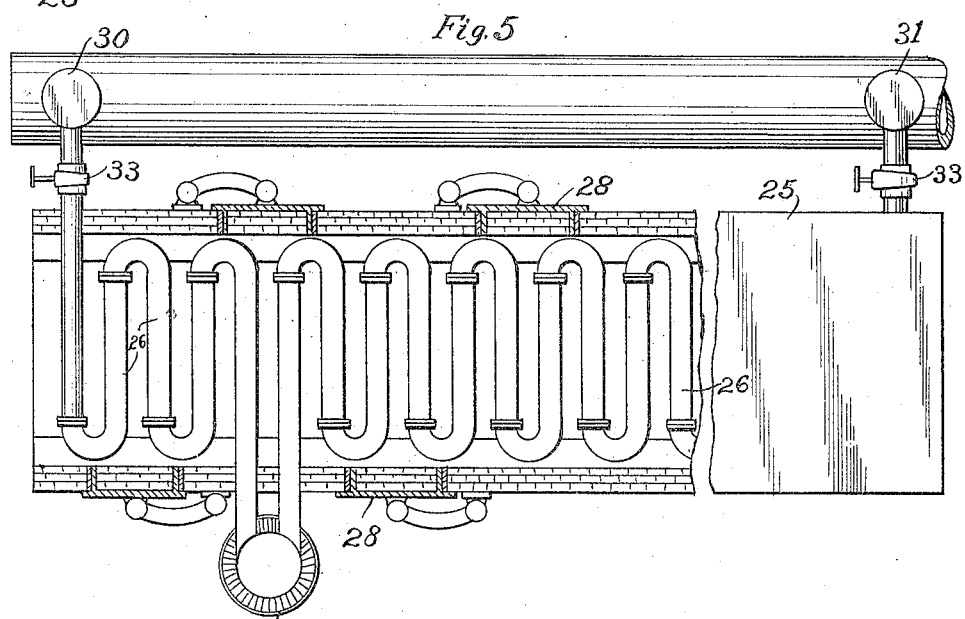
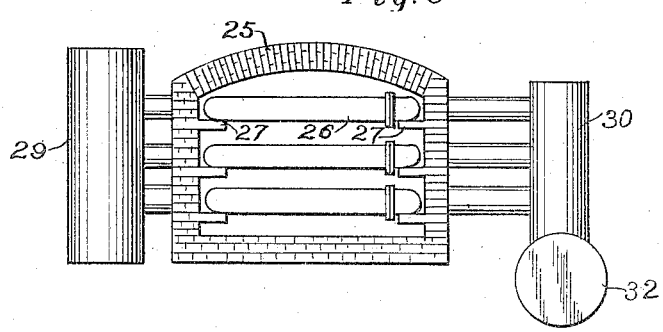

Patented Dec. 9, 1924.

1,518,258

UNITED STATES PATENT OFFICE.

FRANK A. FAHRENWALD, OF CLEVELAND HEIGHTS, OHIO.

APPARATUS FOR PRODUCING AND MAINTAINING HIGH TEMPERATURE.

Application filed March 2, 1921. Serial No. 449,172.

*To all whom it may concern:*

Be it known that I, FRANK A. FAHRENWALD, a citizen of the United States, residing at Cleveland Heights, in the county of Cuyahoga and State of Ohio, have invented a certain new and useful Improvement in Apparatus for Producing and Maintaining High Temperatures, of which the following is a full, clear, and exact description, reference being had to the accompanying drawings.

This invention relates to the production and maintenance of high temperatures by the combustion of fuel as employed in the reduction, melting and refining of metals, the production and manipulation of glass, pottery, and other ceramic materials, the performance of certain chemical reactions requiring high temperatures, and many other uses. The general object of the invention is the provision of apparatus which shall be less expensive in construction and more economical in use than that heretofore used. It is well known that the temperature of the waste gases escaping from most furnaces of the described nature is very high, and in order to decrease the waste of heat it has long been customary to pass such gases through apparatus called "regenerators" or "stoves" which consist essentially of great chambers lined with refractory bricks and also piled full of refractory bricks arranged in honeycomb fashion. A plurality of these regenerators are employed in succession, the hot gases being led into one of the same until the interior is fully heated, after which the heated gases are diverted to another unit of the apparatus and fresh air for producing the combustion is admitted through the heated unit thus becoming preheated and effecting a desirable saving of coal. The use of such apparatus is especially established in connection with the reduction and refining of iron and steel, but is not limited thereto.

For the operation of a blast furnace the amount of air required is so great that a rise of temperature of 100° F. in the entering air provides as many heat units as are produced by the combustion of seven tons of coke; and in addition, up to the limit imposed by the resistance of the furnace walls, an increase of temperature of the entering air is beneficial as increasing the rapidity of production. For purposes of economy the blast furnace gases are burned in regenerators, thereby heating them to temperatures up to 2000° F. yet the temperature to which the entering air is heated according to common practice is only about 800° this being the final temperature of the regenerators. It is necessary to maintain constant the temperature of the air supplied to the furnace which has heretofore been effected by admitting cold air into the mains at a point between the regenerators and furnace, the amount of cold air admitted being constantly decreased as the regenerator cools until it is entirely shut off, at which time it becomes necessary immediately to shift to a new regenerator in order to maintain a uniform temperature.

Likewise in an open hearth furnace for the refining of steel it is customary to save heat by leading the very hot exhaust gas into regenerators, but here also it is necessary to dilute with cold air to maintain a constant temperature; but here the limitation of the air temperature to the final temperature of the regenerators is especially unsatisfactory owing to the fact that there is no limit upon the permissible temperature of the entering air, and the temperatures employed are much higher than those used in the blast furnace.

Regenerators are also used in the treatment of other products than iron and steel, and could be used even more widely except for their unsatisfactory features above mentioned. Besides the regenerators themselves are extremely large and expensive pieces of apparatus, they deteriorate rapidly in use and require frequent repairing, and they become rapidly clogged with dust which chokes the passages and interferes with the heat transfer.

The objects of the present invention are the provision of apparatus for effecting a direct and immediate transfer of heat from the escaping gases to the incoming air; the provision of apparatus whereby the temperature of such incoming air can be maintained steadily at a greatly increased temperature; the provision of a new method of regulating the temperature which shall not require the admission of cold air; the provision of apparatus which shall be less expensive, longer lived, and less duplicated;

the provision of apparatus which shall materially decrease the cost of operating the furnaces and increase the output of the same; while further objects and advantages of the invention will become apparent as the description proceeds.

In the drawings accompanying and forming a part of this application I have illustrated my improvements as applied to a blast furnace and to an open hearth furnace; although it will be understood that these drawings are illustrative only and not limiting upon me either as to the construction or the mode of application of my improved devices. Fig. 1 is a sectional view of a blast furnace illustrating my improved stove applied thereto; Fig. 2 is a longitudinal sectional view and Fig. 3 a transverse sectional view through the stove shown in Fig. 1; Fig. 4 is a longitudinal sectional view through an open hearth furnace illustrating my improved stove applied thereto; and Figs. 5 and 6 are respectively longitudinal and transverse views through the stove shown in Fig. 4.

Describing first by reference characters the apparatus shown in Figs. 1, 2 and 3, 1 represents generally a blast furnace of the usual or any suitable type having tuyères 2—2, a charging top 3, and a discharge conduit 4 for the waste gases. These gases are led into a chambered structure 5, made or at least lined with refractory material, where they are mixed with air and burned in a suitable combustion chamber such as shown at 6. Located inside this chambered structure and in direct contact with the hot combustion products are a plurality of metal pipes 7 through which is forced the air required by the tuyères. In order to obtain and maintain the maximum temperature it is best to use a heat resisting alloy containing essentially iron and chromium and of all compositions which can be used the one which I prefer is as follows:

Iron _____ 72 (limits to make 100)
Chromium __ 25 (limits about 15–35)
Silicon _____ 1.6 (limits about .0–2.0)
Manganese __ .8 (limits about .0–2.5)
Carbon _____ .6 (limits about .0–1)

100.00

A pipe made of the preferred composition has stood for over 1,000 hours a temperature of 2320° F. without softening, warping, disintegration, corrosion or any observable effect whatever. Furthermore such pipes withstand pure oxygen substantially as well as the atmospheric dilution. However, by the employment of the peculiar combination of concurrent and counter-current flow hereinafter described I am enabled to employ successfully alloys of much lower heat resisting value, wherefore I do not limit myself to these compositions but merely describe the same as examples whereby one can achieve most satisfactory results.

The arrangement of these pipes is to some extent a matter of choice although the particular arrangements hereinafter described are advantageous, especially those which provide for the regulation of the temperature and a longer life of the apparatus. The arrangement will of course depend to some extent upon the amount of air employed and the temperature to which it is raised. Thus for a blast furnace the customary air supply pipe is 36 inches in diameter which is equivalent to 36 pipes 6 inches in diameter or 18 pipes 9 inches in diameter. Pipes of a smaller diameter are more easily made and handled and air passing through them will be brought to a uniform temperature much more quickly than in the case of larger pipes. The obvious inconvenience of arranging so many pipes horizontally one above the other with a suitable space between them for the outgoing gases indicates th desirability of arranging them vertically as shown in Figs. 2 and 3, thus also having the added advantage of preventing dust from lodging upon them. The smaller the pipes the shorter they can be made; I have here shown them arranged 18 wide, with U shaped bends 8 at top and bottom.

In order to absorb the largest possible quantity of heat from the outgoing gases it is best to have the pipes arranged generally so that the entering air shall flow in a direction counter to that of the waste gas, for which purpose I provide a pressure blower 10 at the cold end of the stove connected to all the ranks within by a manifold 11. However if the air were conveyed entirely to the hot end of the stove the temperature would probably be too high for the usual blast furnace construction, added to which the pipes themselves would be subjected to an unduly high temperature. Accordingly I divert this air from the stove at a point 13 located at a certain distance from the hot end and deliver it to the header 14 through which it is led to the tuyères by a conduit 15. Between the point 13 and the inlet of the stove I arrange other pipes 16 exactly like the pipes 7, the same being connected at the hot end to the blower 17 and at the other end to the connection 13. As a consequence, the air in the first ranks or coils of pipe flows in the same direction as the hot waste gases, thereby keeping the pipes from becoming overheated, and also cooling the waste gases to a suitable temperature for use through the remainder of the stove. The position of the connection 13 will depend upon the temperature of air desired and this is preferably so chosen that with both the blowers 10 and 17 operating at a reasonable speed the desired temperature of the outflowing air will be obtained. By varying the relative speed of these blowers a considerable degree of regulation of the air temperature can be secured; or by changing the position of the connection 13.

Referring now to the device as shown in Figs. 4 to 6, inclusive, 20 represents generally an open hearth furnace and 21 the burner thereof which is supplied with gas, oil, powdered coal, or like fuel by means of a pipe 22, and with hot air under pressure by means of a pipe 23. Considerations of furnace operation impose practically no limit upon the temperature of the air entering through the pipe 23, and the temperature of the gases escaping from the furnace through the discharge opening 24 is also extremely high. To utilize this temperature I have here shown a stove comprising the chambered member 25 having therein a large number of pipe coils 26 horizontally arranged and supported on suitable ledges 27—27. I have shown the walls of the stove as formed with removable portions 28—28 enabling access to the pipe coils to remove dust therefrom. Also I have shown these coils as connected to a header 29 at a point intermediate the ends of the stove, the terminal portions of the coils being connected by other headers 30—31 to the manifold 32 supplied with air under pressure through any convenient source (not shown). The amount of air admitted from the respective headers 30—31 can be controlled by suitable valves 33—33 and by regulating the comparative opening of these valves the temperature of the entering air can be varied through a considerable range.

I do not restrict myself to the particular designs or arrangement here shown nor to the use of the same for iron and steel manufacture only, nor to use with furnaces of the type and design described, especially in view of the fact that with the high average temperatures securable by my invention it becomes possible to change the design of many furnaces so as to utilize such increased temperature. When used with a blast furnace, even of present design and construction, it is possible to substitute my improved stove for four regenerators costing approximately $100,000.00 each and by its use save from 30 to 50 tons of coke daily otherwise required to heat the entering air and simultaneously to increase the output of the furnace from 15% to 20%. It will be understood that the constructions and uses herein described are merely specimens, and I do not limit myself in any wise except as set forth in the annexed claims.

Having thus described my invention what I claim is:

1. Apparatus for preheating oxygen-containing gas for use in a fuel fired furnace, comprising a chambered member through which are passed the heating gases produced by the furnace, a plurality of coils of pipe composed essentially of an alloy of iron and chromium located in such chamber and extending generally from the cold end to the hot end thereof, said coils having at a point intermediate their ends an outlet adapted to be connected to the combustion chamber of the furnace, and means for causing a flow of oxygen-containing gas into both ends of said coil.

2. The combination, with a fuel fired furnace of a regenerative stove comprising a chambered structure through which pass the waste gases from the furnace, a plurality of pipes of heat resistant alloy located in such chamber in contact with the waste gases and connected with the combustion chamber of the furnace at a point intermediate their length, and means for supplying air under pressure to the ends of said pipes.

3. Apparatus for preheating oxygen-containing gas for use in a fuel-fired furnace, comprising in combination, a chambered structure adapted to have hot combustion products pass therethrough, a plurality of coils of pipe made of a heat resistant alloy composed mostly of iron and chromium located in such chamber and having an outlet at a point intermediate the hottest and coldest parts thereof, means for causing a flow of oxygen-containing gas into both ends of said coils, and means for adjusting the relative rate of flow into the hot and cold ends thereof.

4. A preheating or regenerating stove for gases comprising an elongated chambered structure, means for supplying a heating medium to one end thereof, metallic pipes in the chamber adapted to receive gases at the ends of said chamber and to deliver the same at a point intermediate such ends, whereby the flow of the gases in said pipes will be in the same general direction as that of the heating medium at the hot end of the chamber and in the opposite direction from that of the heating medium at the cool end of the chamber.

5. A preheating or regenerating stove for gases comprising an elongated chambered structure adapted to have hot gases passed therethrough, metallic pipes inside said chamber adapted to have the gases to be heated passed therethrough, said pipes having inlets at or near each end of said chamber and an outlet intermediate the ends of said chamber, and means for producing an inflow of the gases into both inlets and an outflow through said outlet.

6. A preheating or recuperative stove for gases comprising conduits of heat conducting material defining passageways for the respective gases arranged in heat transferring relation to each other, and connections whereby the gases possess only a concurrent flow adjacent the hot end and only a counter current flow adjacent the cold end of the apparatus, and the outlet for the heated gases is intermediate the length of the passageways.

7. A preheating or recuperative stove for gases comprising conduits of heat conducting material defining passageways for the respective gases arranged in heat transferring relation to each other, and connections whereby cold gases are introduced into the hot end of the apparatus to protect the conduit walls and connections whereby the gases to be heated are caused to flow in the opposite direction from the waste gases at points adjacent the cold end of the apparatus.

8. A preheating or recuperative stove for gases comprising conduits of heat conducting material defining passageways for the respective gases arranged in heat transferring relation to each other, connections whereby the respective gases have a counter current flow throughout the major length of the apparatus, combined with connections for introducing cold gases at the hot-gas intake end to protect the conduit walls.

In testimony whereof, I hereunto affix my signature.

FRANK A. FAHRENWALD.